G. H. STALLMAN.
HOG SCRAPING MACHINE.
APPLICATION FILED NOV. 27, 1917.
1,273,198.
Patented July 23, 1918.
5 SHEETS—SHEET 3.
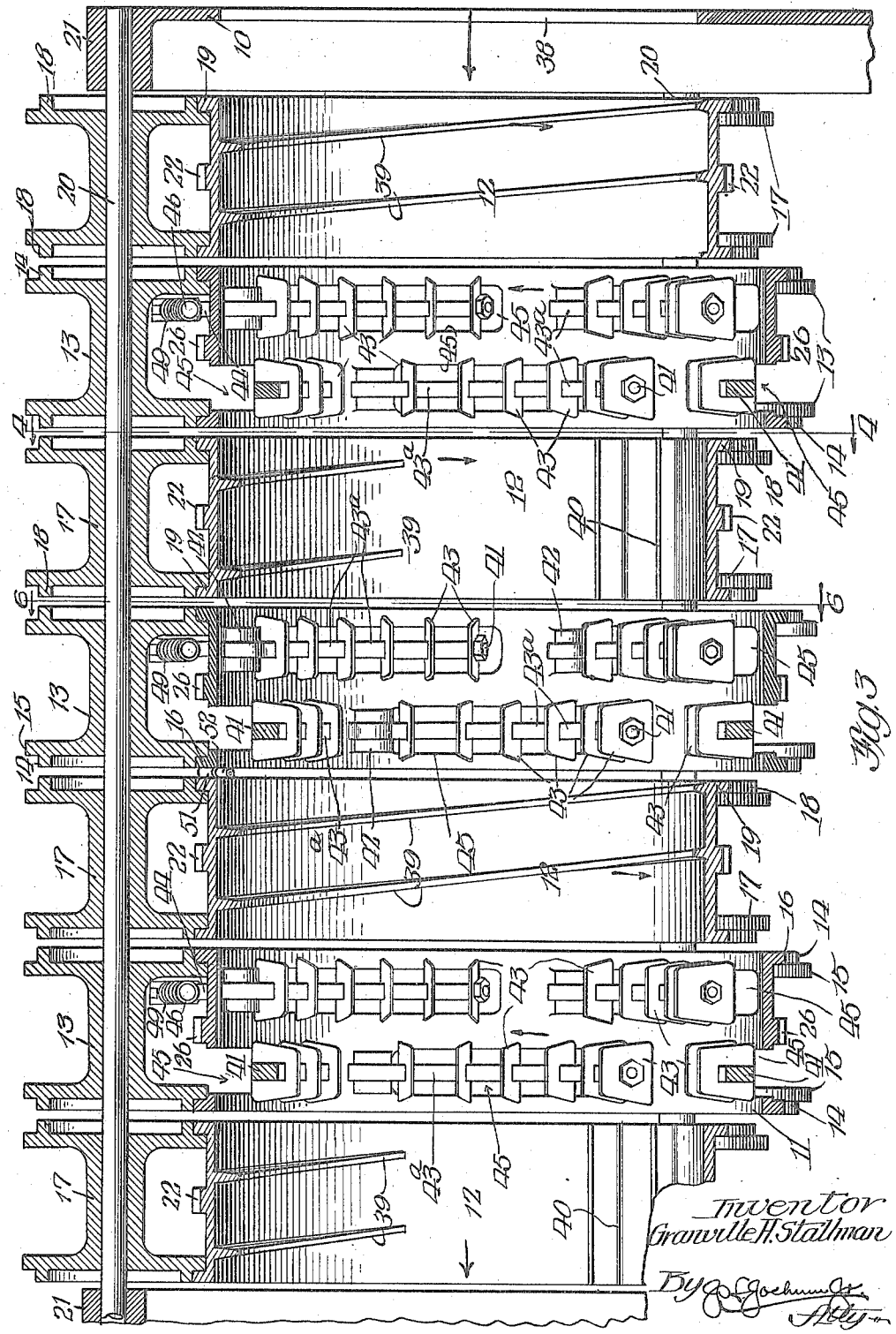

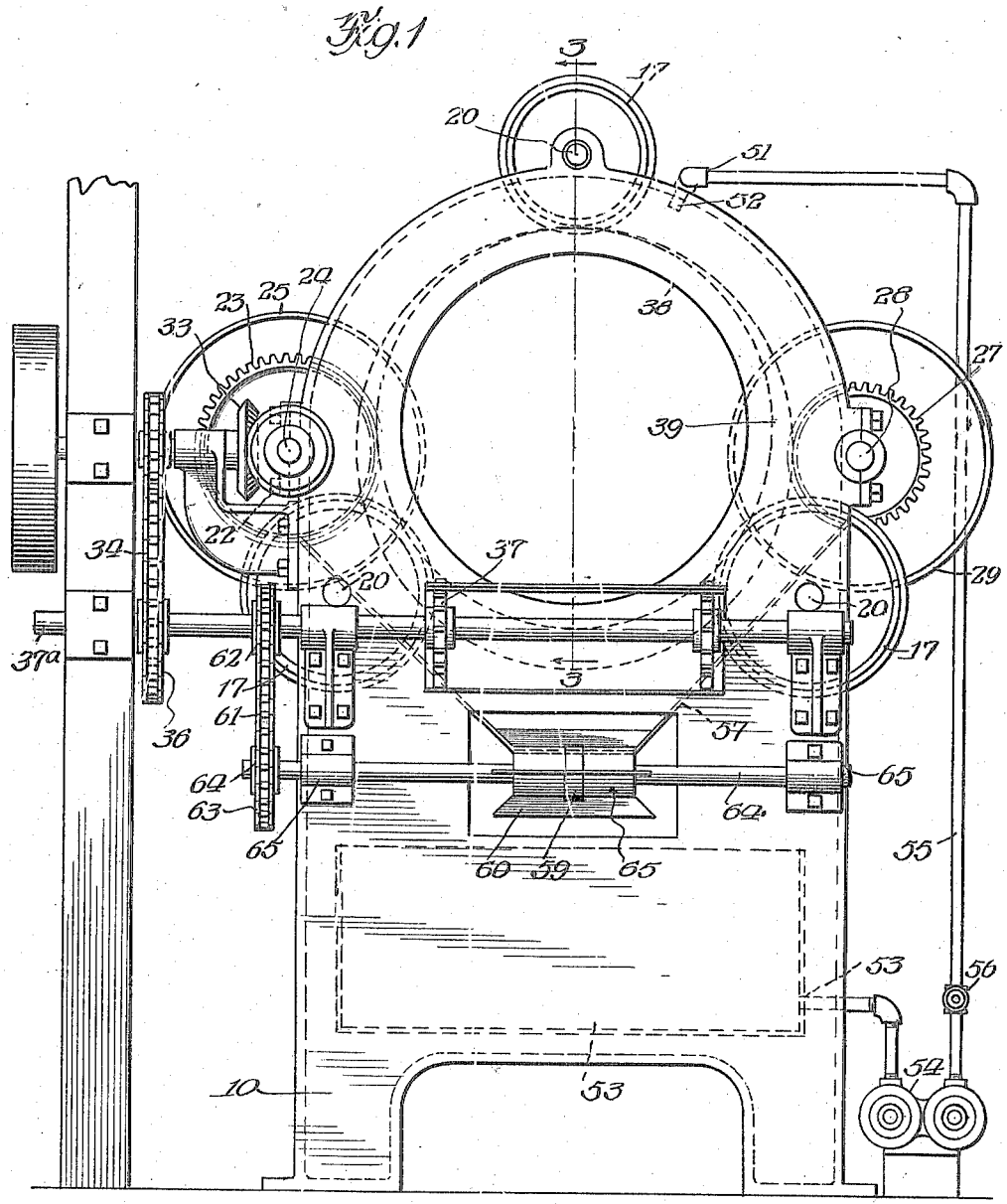

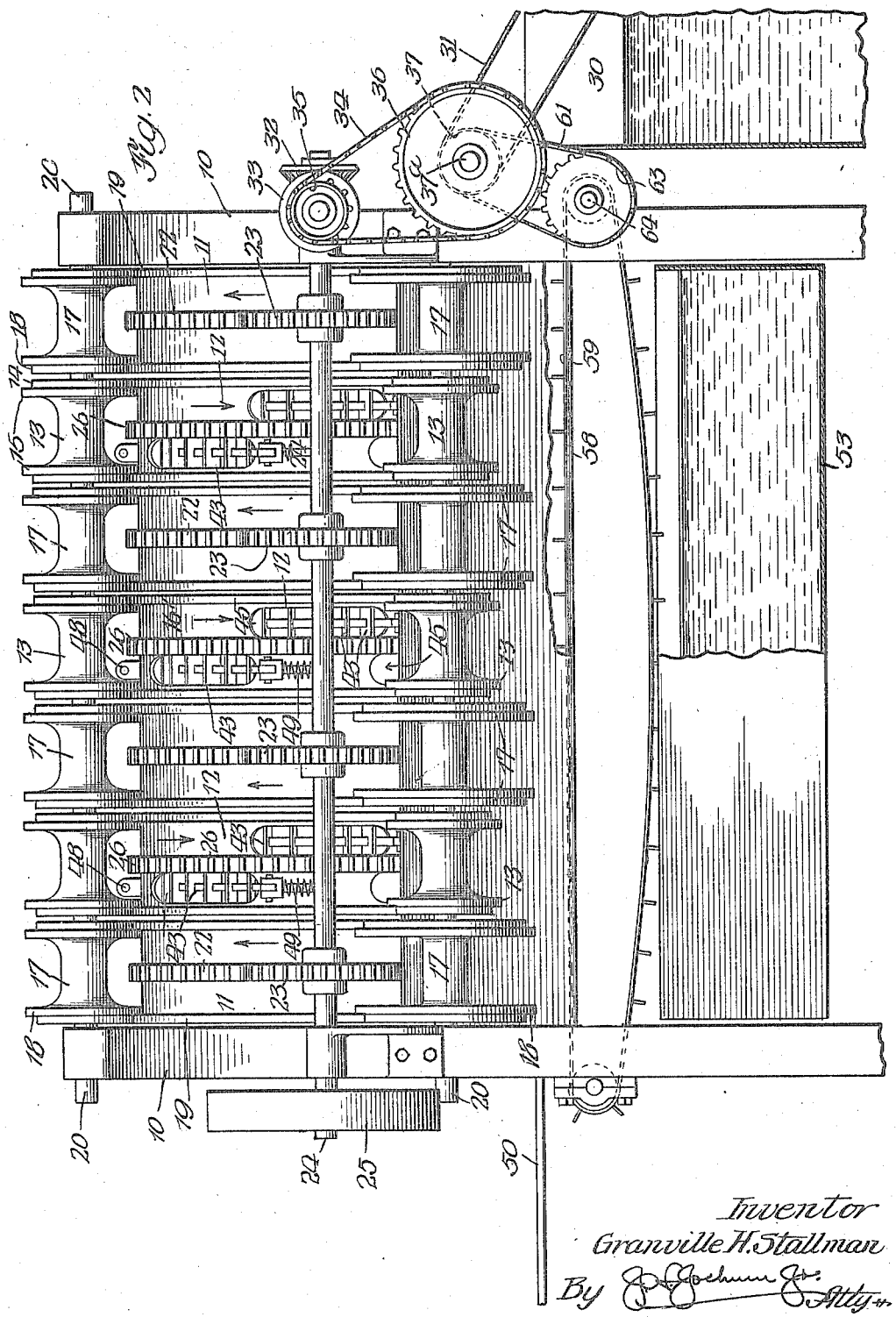

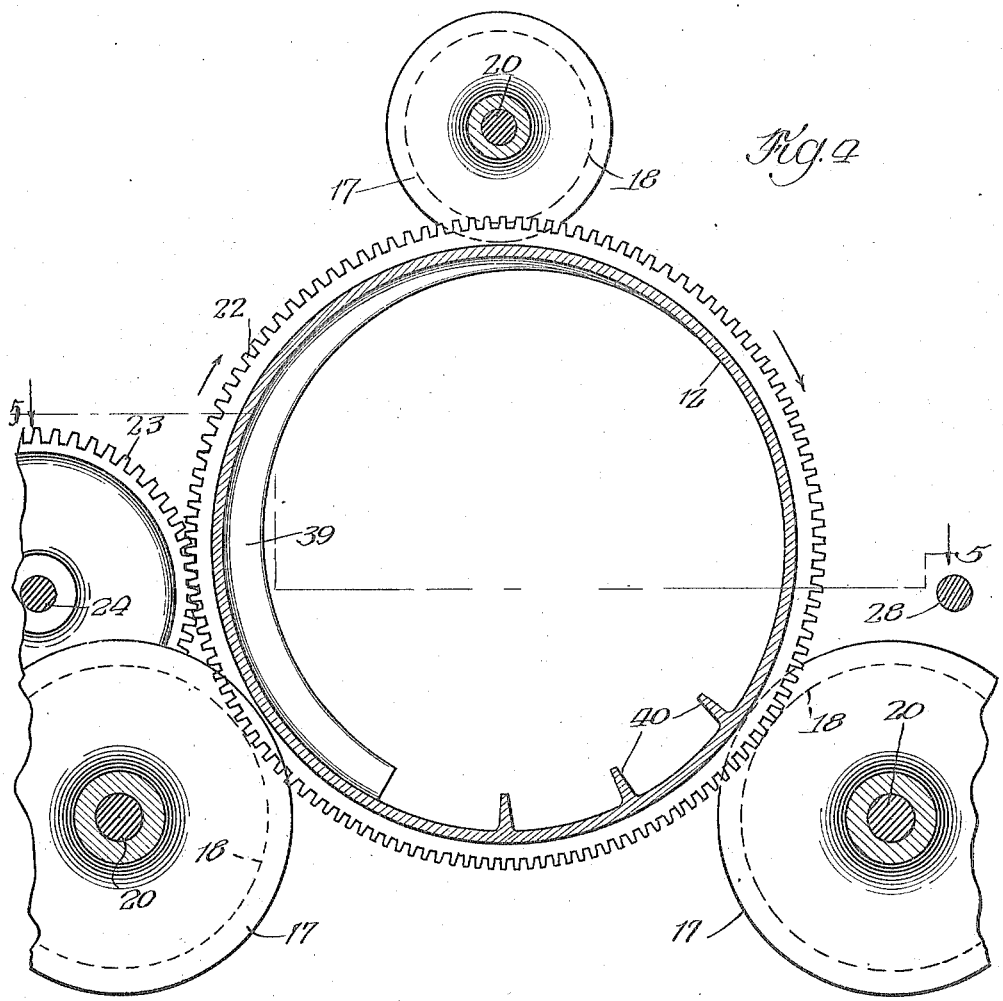
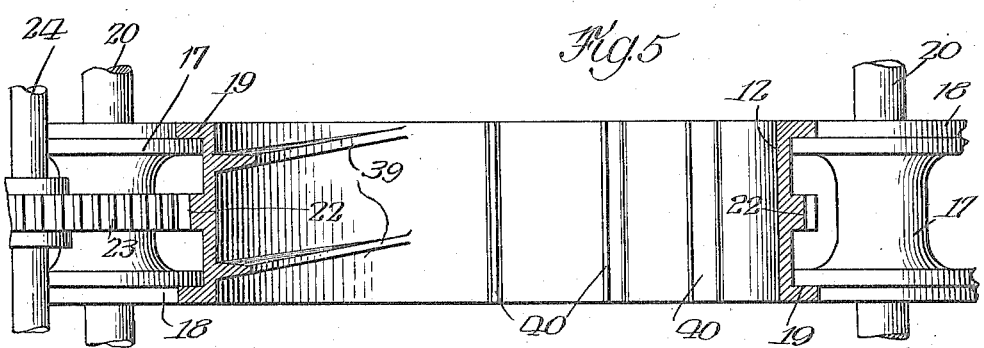

G. H. STALLMAN.
HOG SCRAPING MACHINE.
APPLICATION FILED NOV. 27, 1917.

1,273,198.

Patented July 23, 1918.
5 SHEETS—SHEET 5.

Inventor
Granville H. Stallman
By J. F. Jochum Jr.
Atty.

UNITED STATES PATENT OFFICE.

GRANVILLE H. STALLMAN, OF CHICAGO, ILLINOIS.

HOG-SCRAPING MACHINE.

1,273,198. Specification of Letters Patent. Patented July 23, 1918.

Application filed November 27, 1917. Serial No. 204,181.

*To all whom it may concern:*

Be it known that I, GRANVILLE H. STALLMAN, a citizen of the United States, residing at Chicago, in the county of Cook and State of Illinois, have invented certain new and useful Improvements in Hog-Scraping Machines, of which the following is a specification.

This invention relates to improvements in hog scraping machines, and one of the objects of the same is to provide improved mechanism whereby the carcass will be regularly fed through the machine and intermittently rotated during such feeding movement, all of the parts of the carcass being subjected to the action of the cleaning elements which are continuously in contact with the carcass and move thereover with a wiping action.

A further object is to provide an improved machine of this character having automatically adjustable cleaning elements which engage and remain in contact with the surface of the carcass, and which elements are adapted to compensate the varying sizes of the carcass, the speed of rotation of the cleaning elements about the carcass increasing in proportion to the size of the carcass.

To the attainment of these ends and the accomplishment of other new and useful objects as will appear, the invention consists in the features of novelty, in substantially the construction, combination and arrangement of the several parts hereinafter more fully described and claimed and shown in the accompanying drawings illustrating the invention and in which—

Figure 1 is a front end elevation of an improved machine of this character embodying the principles of this invention.

Fig. 2 is a side elevation taken from the left hand side of Fig. 1.

Fig. 3 is an enlarged detail sectional view taken on line 3—3, Fig. 1.

Fig. 4 is an enlarged detail sectional view taken on line 4—4, Fig. 3.

Fig. 5 is a horizontal sectional view taken on line 5—5, Fig. 4.

Figure 6:
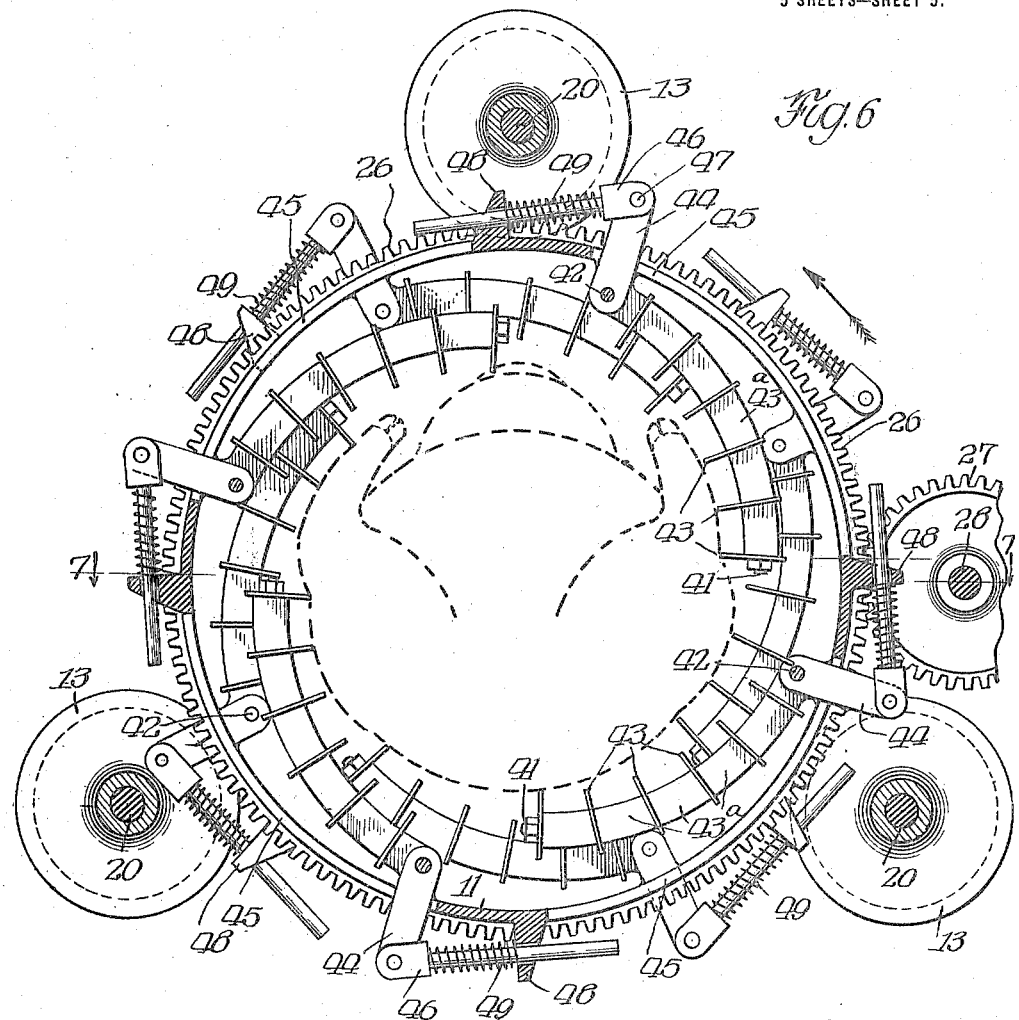
Fig. 6 is a vertical sectional view taken on line 6—6, Fig. 3.
Figure 7:
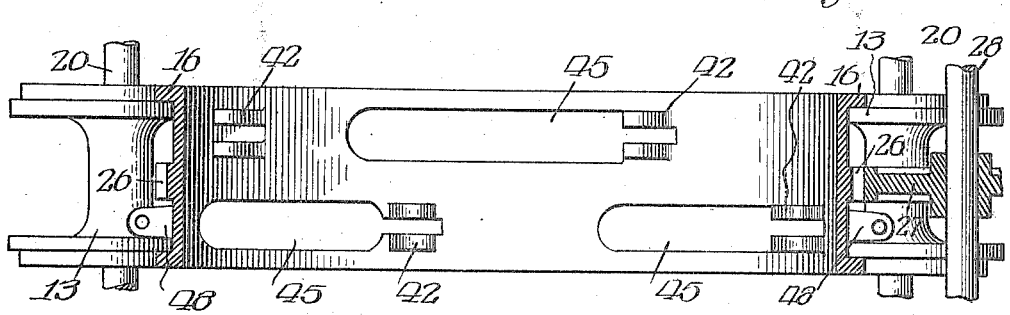
Fig. 7 is a sectional view taken on line 7—7, Fig. 6 and with parts omitted.

Referring more particularly to the drawings, the numeral 10 designates a suitable supporting structure arranged at any suitable elevation and upon which structure is mounted a cleaning mechanism. The cleaning mechanism comprises a series of annular elements 11 which may be of any desired size and are spaced laterally from each other to permit a series of annular elements 12 to be arranged therebetween.

The elements 11 are supported in any desired or suitable manner, preferably by means of a series of rollers 13 preferably provided with laterally projecting flanges 14 arranged a short distance inwardly from the periphery 15 of the roll, and the flange 14 is adapted to be engaged by an annular flange 16 on the element 11 so as to hold the element in position. The elements 12 are each supported by a series of rolls 17, similarly constructed and having a laterally projecting flange 18 coöperating with a flange 19 on the outer periphery of the annular member 12. The respective pulleys 13, 17 are arranged in alinement with each other and are all preferably loosely mounted upon an axle 20 having suitable bearings 21 in the frame 10.

The elements 11 are of a diameter somewhat greater that the diameter of the elements 12, so that when the elements are assembled in alinement with each other, the elements 11 will be supported eccentrically with respect to the elements 12 so that when the carcass is being fed through the elements 11, 12 in a manner to be hereinafter set forth, the elements 12 will serve as the supporting elements to hold the carcass up and out of engagement with the lower portion of the elements 11 so that an undue strain will not be placed upon the scrapers during the passage of the carcass through the machine as will be hereinafter set forth.

Each of the elements 12 is provided with a peripheral gear 22, with which a driving gear 23 meshes so as to rotate the elements 12 and these driving gears 23 are themselves rotated by means of a shaft 24 with which is connected a pulley 25 for rotating the shaft.

The elements 11 are also provided with peripheral gear teeth 26 with which a gear 27 meshes and the gears 27 are connected with a shaft 28 that receives its motion from a pulley 29, and the gears 23, 27 are so rotated as to cause the elements 11, 12 to rotate in the opposite direction.

The carcass to be cleaned is fed from a tank 30 by means of a conveyer 31 which is operated by means of the shaft 24 through the medium of intermeshing gears 32, 33, and a sprocket chain 34 which passes over a suitable sprocket 35 and a sprocket 36, the latter operating the pulley 37 over which the conveyer 31 passes.

As the carcass is elevated from the tank 30, it is fed into the machine through the opening 38 in the front of the frame 10 and is delivered into the front element 12. Arranged within the elements 12 are spirally disposed projecting ribs 39 which extend inwardly from the periphery of the annular member and gradually increase in height throughout the length of the rib and the ribs are arranged to extend partially around the element.

These ribs 39 catch the carcass as it is fed into the element and advance the same therethrough so that it will extend across the element 11 and project into the next successive element 12.

All of the elements 12 with the exception of the foremost element are provided with inwardly projecting ribs 40 which are spaced from each other in a direction extending around the circumference of the member, and the ribs 40 extend transversely of the ribs 39 and operate intermittently to rotate the carcass during its advancing movement through the elements. The ribs 40 are omitted from the first element 12 because, when the carcass is first placed in the machine, it is not necessary to rotate it, but as it is advanced through the machine it is intermittently rotated by these ribs.

The scraper elements 11 are provided with scraper members 41, shown more particularly in Figs. 3 and 6, and which members are pivotally supported by suitable bearings 42, and the body portion of the members 41 are arranged within the element 11 and are preferably curved in a direction extending around the circumference of the element. These members 41 may be of any desired length and secured thereto are scraper blades 43 which may be of any desired size and configuration and are removably secured to the member 41 in any suitable manner, and are spaced laterally from each other and in a direction extending lengthwise of the member 41, by suitable spacing members 43ª.

The member 41 is provided with an arm 44 which projects therefrom beyond the pivot 42 and through a suitable opening 45 in the element 12, to the outside thereof, and connected to the arm 44 adjacent the outer periphy of the element 11, is a link 46 having a pivotal connection 47 and adapted to pass through a suitable guide 48. An elastic member 49, such as a spring, surrounds the link 46 between its pivot 47 and the guide 48 and tends normally to move the scraper member 41 about its pivot 42 in a direction toward the diametric center of the element, so that when the carcass is passed into the element 11, the members 41 will be moved about their pivots in the opposite direction and against the stress of the elastic member 49 so as to hold the scraper blades 43 yieldingly against the carcass and in constant contact therewith, so that when the elements 11 are rotated, the carcass being supported by the adjacent elements 12, it will be manifest that the scraper blades 43 will travel around the carcass in contact therewith, and will have a wiping or scraping action on the carcass at all times.

Any number of these scraper members 41 may be provided in each of the elements 11, and it will be manifest that when the carcass is passed between these members 41 so as to be surrounded thereby, the members 41 will not only compensate the varying sizes of the carcass, but the speed of rotation of the cleaning elements about the carcass increases in proportion to the size of the carcass, because the larger the carcass, the further the scraper elements will be forced toward the periphery of the element 11, whereas a smaller carcass will permit the scraping elements to be moved nearer the center of rotation of the element.

Thus it will be seen that the elements 12 will operate as the feeding elements and will also intermittently rotate the carcass during its passage through the machine, and inasmuch as the lower portion of the elements 11 are disposed to stand below the lower portion of the elements 12, it will be manifest that the scraper elements will be relieved of the weight of supporting the carcass during its passage through the cleaning element, as the distance between the bottom of the elements 12 and the bottom portion of the next adjacent element 11 is sufficient to permit of such an action.

The carcass after it has passed through the elements 11 and 12 will be discharged therefrom by the ribs 39 on the last element 12 onto a suitable support or table 50 (see Fig. 2) from which it may be removed in any suitable manner.

During the passage of the carcass through the machine, and while the hair is being scraped therefrom by the scraping members, a supply of water is being delivered into the elements, preferably from a pipe 51 which is arranged in a suitable position adjacent the peripheries of the elements 11, 12 and is provided with nozzles 52 which are preferably adapted to extend into the space between the proximate lateral edges of adjacent elements 11 and 12, the latter being held spaced from each other a suitable distance to permit the nozzles to project thereinto.

The pipe 51 receives its supply from the tank 53 and for that purpose, a suitable pump 54 may be provided. This pump has communication with the tank 53 to draw the water therefrom and force the same through a suitable pipe 55 into the pipe 51, a valve 56 being provided, if desired, for controlling the flow of water through the pipe 55.

The hair as it is scraped from the carcass and the water which is discharged into the elements 11, will pass out of the elements through the openings 45 and also between the adjacent elements and will be collected in any suitable manner such as in a trough 57 arranged to extend beneath the elements, and this trough is provided with a perforated bottom 58. The trough is arranged above the tank 53 so that the water will be discharged back into the tank and the hair will be collected upon the perforated bottom of the trough 57. Any suitable means may be provided for removing the collected hair, such for instance, as a suitable conveyer 59 having flights 60 connected with the conveyer and movable over the perforated bottom of the trough, so as to scrape the hair from the bottom of the trough and deliver the same out of the end of the trough. The conveyer 59 is adapted to be operated from the shaft 37ª of the pulley 37 by means of a sprocket chain 61 passing over a sprocket 62 on the shaft 37ª and a similar sprocket 63 on the shaft 64 of the pulley 65 over which the conveyer 60 passes, and which shaft 64 is mounted in suitable bearings 65 on the frame of the machine.

With this improved construction it will be manifest that the carcass will be subjected to a continuous scraping or wiping action by the scraper blades 43 which latter remain in constant engagement with the carcass during its passage through the scraper element, and it will be also manifest that all parts of the carcass will be engaged by the scraper elements, the carcass being advanced through the machine by the ribs 49 and will be given an intermittent rotation during such advancement by the ribs 40.

While the preferred form of construction has been herein shown and described, it is to be understood that many changes may be made in the design and in the specific arrangement of the various parts within the scope of the claims without departing from the spirit of this invention.

What is claimed as new is:

1. A hog scraping machine embodying a series of adjacent annular elements through which the carcass is fed, means connected with one of the elements for advancing the carcass through the elements, and scraper elements carried by another of the elements and adapted for free adjustment by the carcass.

2. A hog scraping machine embodying a series of adjacent annular elements through which the carcass is fed, means connected with one of the elements for advancing the carcass through the machine, scraper elements swingingly supported within another of the annular elements, and means tending normally to move the elements toward the center of the annular element, said elements being adapted to be automatically shifted against the stress of the last said means by the carcass.

3. A hog scraping machine embodying a series of adjacent annular elements through which the carcass is fed, means connected with one of the elements for advancing the carcass through the machine, scraper elements swingingly supported within another of the annular elements, and means tending normally to move the elements toward the center of the annular element, said scraper elements being adapted to automatically compensate the varying sizes of the carcass.

4. A hog scraping machine embodying a plurality of adjacent rotatable annular elements, means for rotating them, means carried by one of the elements for advancing the carcass through the elements, swingingly mounted scraper elements carried by another of the elements, and yielding means operating upon the scraper elements and tending normally to move the latter toward the diametric center of the element, said scraper elements being shiftable against the stress of the said yielding means, whereby the scraper elements will be held continuously against the carcass.

5. A hog scraping machine embodying a plurality of adjacent rotatable annular elements, means for rotating them, means carried by one of the elements for advancing the carcass through the elements, swingingly mounted scraper elements carried by another of the elements, and yielding means operating upon the scraper elements and tending normally to move the latter toward the diametric center of the element, said scraper elements being shiftable against the stress of the said yielding means, whereby the scraper elements will be held continuously against the carcass, the speed of rotation of the scraper elements about the carcass increasing in proportion to the size of the carcass.

6. A hog scraping machine embodying a series of rotatable adjacent annular elements through which the carcass is fed, means connected with one of the elements for advancing the carcass through the elements, scraper elements pivotally carried by another of the elements, yielding means tending normally to move the said scraper elements in one direction about their pivots, and means for rotating the carcass.

7. A hog scraping machine embodying a series of rotatable adjacent annular elements through which the carcass is fed, means connected with one of the elements for advancing the carcass through the elements, scraper elements pivotally carried by another of the elements, yielding means tending normally to move the said scraper elements in one direction about their pivots, and means for rotating the carcass, during a portion of its advancing movement.

8. A hog scraping machine embodying a series of rotatable adjacent annular elements through which the carcass is fed, means connected with one of the elements for advancing the carcass through the elements, scraper elements pivotally carried by another of the elements, yielding means tending normally to move the said scraper elements in one direction about their pivot, and means connected with one of the elements for intermittently rotating the carcass during its passage through the said annular elements.

9. A hog scraping machine embodying a series of adjacent rotatable annular elements, pivotally mounted yielding scraper members arranged within one of the said elements and adapted to be automatically positioned by the carcass during its passage therebetween, and a spirally arranged rib projecting inwardly from another of the annular elements for advancing the carcass between the scrapers and through the machine.

10. A hog scraping machine embodying a series of adjacent rotatable annular elements, pivotally mounted yielding scraper members arranged within one of the said elements and adapted to be automatically positioned by the carcass during its passage therebetween, a spirally arranged rib projecting inwardly from another of the annular elements and extending partially therearound, and one or more radially arranged ribs projecting inwardly from the periphery of the last said element for rotating the carcass, said spiral rib operating to advance the carcass through the machine.

11. A hog scraping machine embodying a plurality of concentrically arranged and laterally spaced annular rotatable members, means on the inner face of said members for advancing the carcass therethrough, a second series of concentrically arranged annular members alternately disposed with respect to the annular members of the first recited series, the second series of annular members being eccentrically arranged with respect to the members of the first recited series, whereby the lower portion of one series of members will be disposed at a higher elevation than the corresponding portion of the members of the other series, to support the carcass out of contact with the lower portion of the members of the second recited series, and yielding and pivotally mounted scraper members supported by the second recited series of members.

12. A hog scraping machine embodying a plurality of concentrically arranged and laterally spaced annular rotatable members, means on the inner face of said members for advancing the carcass therethrough, a second series of concentrically arranged annular members alternately disposed with respect to the annular members of the first recited series, the second series of annular members being eccentrically arranged with respect to the members of the first recited series, whereby the lower portion of one series of members will be disposed at a higher elevation than the corresponding portion of the members of the other series, to support the carcass out of contact with the lower portion of the members of the second recited series, yielding and pivotally mounted scraper members supported by the second recited series of members, said scraper members being curved and extending in a direction across the supporting member, and laterally spaced scraper blades connected with the scraper members.

13. A hog scraping machine embodying a plurality of concentrically arranged and laterally spaced annular rotatable members, means on the inner face of said members for advancing the carcass therethrough, a second series of concentrically arranged annular members alternately disposed with respect to the annular members of the first recited series, the second series of annular members being eccentrically arranged with respect to the members of the first recited series, whereby the lower portion of one series of members will be disposed at a lower elevation than the corresponding portion of the members of the other series, to support the carcass out of contact with the lower portion of the members of the second recited series, yielding and pivotally mounted scraper members, supported by the second recited series of members, and one or more ribs projecting inwardly from some of said members and extending in a direction lengthwise of the member and transversely of the said means.

14. A hog scraping machine embodying a plurality of concentrically arranged and laterally spaced annular rotatable members, means on the inner face of said members for advancing the carcass therethrough, a second series of concentrically arranged annular members alternately disposed with respect to the annular members of the first recited series, the second series of annular members being eccentrically arranged with respect to the members of the first recited series, whereby the lower portion of one series of members will be disposed at a higher elevation than the corresponding portion of the members of the other series, to support the carcass out of contact with the lower portion of the members of the second recited series, yielding and pivotally mounted scraper members supported by the second recited series of members, means for rotatably supporting said annular members, and means for rotating them.

15. A hog scraping machine embodying two series of rotatably supported annular members through which the carcass is passed, one of said series being eccentrically mounted with respect to the other series, whereby the carcass will be supported out of contact with one series of members by the other series, scraper members arranged in the former series, advancing means arranged in the latter series, and means arranged in some of the latter series of members for also rotating the carcass, said scraper members each embodying a pivotally mounted curved arm extending in a direction around the member, and laterally spaced blades connected with the arm and spaced from each other in a direction lengthwise of the arm.

16. A hog scraping machine embodying two series of rotatably supported annular members through which the carcass is passed, one of said series being eccentrically mounted with respect to the other series whereby the carcass will be supported out of contact with one series of members by the other series, scraper members arranged in the former series, advancing means arranged in the latter series, means arranged in some of the latter series of members for also rotating the carcass, said scraper members each embodying a pivotally mounted curved arm extending in a direction around the member, and laterally spaced blades connected with the arm and spaced from each other in a direction lengthwise of the arm, and yielding means connected with the arms and tending normally to move the arms in one direction about the pivot thereof.

17. A hog scraping machine embodying two series of rotatably supported annular members through which the carcass is passed, one of said series being eccentrically mounted with respect to the other series, whereby the carcass will be supported out of contact with one series of members by the other series, scraper members arranged in the former series, advancing means arranged in the latter series, means arranged in some of the latter series of members for also rotating the carcass, said scraper members each embodying a pivotally mounted curved arm extending in a direction around the member, and laterally spaced blades connected with the arm and spaced from each other in a direction lengthwise of the arm, said scraper supporting members having openings through their walls for the passage of hair and water therethrough, and means for discharging water into the members.

18. A hog scraping machine embodying two series of rotatably supported annular members through which the carcass is passed, one of said series being eccentrically mounted with respect to the other series whereby the carcass will be supported out of contact with one series of members by the other series, scraper members arranged in the former series, advancing means arranged in the latter series, means arranged in some of the latter series of members for also rotating the carcass, said scraper members each embodying a pivotally mounted curved arm extending in a direction around the member, and laterally spaced blades connected with the arm and spaced from each other in a direction lengthwise of the arm, roller supporting means for the individual members, and means for rotating each of the members.

19. A hog scraping machine embodying a series of alternately arranged rotatable annular supporting and advancing elements and scraping elements, means for supporting and means for rotating them, the diameter of the scraping elements being greater than the diameter of the other elements whereby the carcass will be supported by the latter out of contact with the former during the advancement thereof through the elements, and means for intermittently rotating the carcass during its advancement.

20. A hog scraping machine embodying a series of alternately arranged rotatable annular supporting and advancing elements and scraping elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, said scraper elements having openings through their walls for the passage of hair and water therethrough, and means for supplying water into the said elements.

21. A hog scraping machine embodying a series of alternately arranged rotatable annular supporting and advancing elements and scraper elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, said scraper elements having openings through their walls for the passage of hair and water therethrough, means for supplying water into the said elements, and means extending beneath said elements for catching and conveying away the hair.

22. A hog scraping machine embodying a series of alternately arranged rotatable annular supporting and advancing elements and scraper elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, said scraper elements having openings through their walls for the passage of hair and water therethrough, means for supplying water into said elements, and means extending beneath said elements for catching and conveying away the hair, the last recited means embodying provisions for separating the hair and water.

23. A hog scraping machine embodying a series of alternately arranged rotatable annular supporting and advancing elements and scraper elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, a carcass receiving tank, and means for conveying the carcass from the tank and delivering it into the said annular members.

24. A hog scraping machine embodying a series of alternately arranged rotatable annular supporting and advancing elements and scraper elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, and rollers for supporting said elements, said rollers also operating to hold the annular members spaced.

25. A hog scraping machine embodying a series of alternately arranged rotatable annular supporting and advancing elements and scraper elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, rollers for supporting the elements, and gearing individual to the elements for rotating the elements.

26. A hog scraping machine embodying a series of alternately arranged rotatable annular supporting and advancing elements and scraper elements, means for supporting and means for rotating them, the diameter of the scraper elements being greater than the diameter of the other elements whereby the carcass will be supported by the latter out of contact with the former during the advancement thereof through the elements, means for intermittently rotating the carcass during its advancement, rollers for supporting the elements, overlapping flanges on the rollers and the respective elements for holding the elements laterally spaced, and means for rotating the elements.

27. A hog scraping machine embodying a series of adjacent annular elements through which the carcass is fed, means connected with one of the elements for advancing the carcass through the elements, scraper elements carried by another of the elements and adapted for free adjustment by the carcass, and means individual to the elements for rotating them, said elements rotating in opposite directions.

28. A hog scraping machine embodying a series of rotatable adjacent annular elements through which the carcass is fed, means connected with one of the elements for advancing the carcass through the elements, scraper elements pivotally carried by another of the elements, yielding means tending normally to move the scraper elements in one direction about their pivot, means connected with one of the elements for intermittently rotating the carcass during its passage through the said annular elements, and means for rotating the feeding and scraper supporting elements in opposite directions.

29. A hog scraping machine embodying a series of alternately arranged rotatable annular supporting and advancing elements and scraping elements, means for supporting and means for rotating the elements in opposite directions, the diameter of the scraping elements being greater than the diameter of the other elements whereby the carcass will be supported by the latter out of contact with the former during the advancement thereof through the elements, and means for intermittently rotating the carcass during its advancement.

30. A hog scraping machine embodying a series of alternately arranged rotatable annular supporting and advancing elements and scraper elements, means for supporting the elements, means for rotating the alternating elements in opposite directions, the diameter of the scraper elements being greater than the diameter of the other elements whereby the carcass will be supported by the latter out of contact with the former during the advancement thereof through the elements, means for intermittently rotating the carcass during its advancement, a carcass receiving tank, and means for conveying the carcass from the tank and delivering it into the said annular members.

In testimony whereof I have signed my name to this specification on this 7th day of November, A. D. 1917.

GRANVILLE H. STALLMAN.

Copies of this patent may be obtained for five cents each, by addressing the "Commissioner of Patents, Washington, D. C."